United States Patent [19]

Goff, Jr. et al.

[11] Patent Number: 4,458,253

[45] Date of Patent: Jul. 3, 1984

[54] THERMAL PRINT APPARATUS USING A THERMAL TRANSFER RIBBON SUCH AS A MULTI-COLORED ONE, AND A PRINTING METHOD

[75] Inventors: Willie Goff, Jr.; Ta C. Ky, both of Austin Tex.

[73] Assignee: International Business Machines Corporation, Armonk, N.Y.

[21] Appl. No.: 454,918

[22] Filed: Dec. 30, 1982

[51] Int. Cl.[3] .............................................. G01D 15/10

[52] U.S. Cl. ................................ 346/76 PH; 346/1.1; 400/120; 400/240.3

[58] Field of Search ................. 346/76 PH, 76 R, 1.1; 400/120, 240.3

[56] References Cited

U.S. PATENT DOCUMENTS 3,726,212 4/1973 Combs ........................ 346/76 PH X 4,250,511 2/1982 Stein et al. ..................... 346/76 PH

*Primary Examiner*—Joseph W. Hartary

*Attorney, Agent, or Firm*—John L. Jackson

[57] ABSTRACT

In a thermal printer the transfer ribbon such as one having sets of transverse color stripes is guided over of a ribbon support which carries the heat applying print head. The ribbon support is movable relative to the paper by an eccentric to move the ribbon into and out of contact with the paper. A support beam and a guiding roller are provided immediately behind print area to guide the ribbon away from the paper path in an angle of more than 45 degrees. This assures a separation of the ribbon from the paper essentially normal to its surface, thus avoiding shear upon relative movement between paper and ribbon and negates the need for a relatively bulky ribbon carrier material. Color printing is performed by clamping paper and ribbon, applying heat, transferring color material, retracting the ribbon from the paper, advancing the ribbon to the next color area, printing again on the very same paper area as often as desired, repeating this as often as necessary and advancing the paper after finishing the present print line.

11 Claims, 2 Drawing Figures

THERMAL PRINT APPARATUS USING A THERMAL TRANSFER RIBBON SUCH AS A MULTI-COLORED ONE, AND A PRINTING METHOD

DESCRIPTION

1. Technical Field

The present invention relates to thermal printing systems in general and to the guiding system of the print media and the ribbon as well as color printing in particular.

In thermal transfer printing ink material or the like is selectively transferred from a carrier like a thermal transfer ribbon to a print media, such as ordinary paper, by applying thermal energy to localized areas of the ribbon. Thermal printing might be performed in using one color only, such as black, or by using a multi-colored ribbon for color printing outfitted, e.g., with the three basic colors yellow, magenta, and cyan.

2. Background Art

One example of a thermal print system is disclosed in U.S. Pat. No. 4,250,511 which uses a thermal transfer ribbon having arranged in a repeating series of stripes the three basic colors yellow, magenta, and cyan as well as black. The stripes are disposed perpendicular to the ribbon's direction of transport and they span the whole length of the print line, i.e., the whole print media width. The heat applying print head is formed by a strip of thermal elements arranged in a row transverse to the print media and ribbon transport direction. Each element is connected to a ground lead and to a selection lead. Control means selectively energizes the selected leads. The print media, usually ordinary paper, is pressed against the colored surface of the thermal ribbon by a page wide roller whose axis is parallel to the print line. The thermal ribbon itself is kept against and supported by the stationary arranged print head so that the print line is formed by the nip between the print head and the backing roller. Upon printing any one of the thermal elements may be energized to transfer a spot of a particular color of that color stripe being carried over the head. To permit the deposit of any color at a given location on the print media, the ribbon is advanced at a faster rate than the print media.

For generating prints of higher quality more picture elements (pel) per given distance are necessary. More pels (e.g., 100 pel per inch) requires smaller thermal elements, e.g., those covering an area of less than about 10 mils (254 micrometer). This presents physical wiring problems. The formulation of the thermal transfer ribbon material also affects the printing process. There are two basic kinds of ribbon: one ribbon is based on wax and the other is based on resin, expressed in a somewhat simplified way. With a wax based ribbon less thermal energy is necessary for softening the material for transferring it to the print media, since wax has a lower softening temperature. However, the time needed for cooling and drying on the print media is longer and the material tends to spread. On the other hand, with a thermal plastic resin based ribbon a higher temperature is necessary for melting the color material for transferring it to the print media, but cooling and drying on the print media is shorter and the material does not run out or spread. Consequently, for higher resolution and faster printing a resin based ribbon is best but the faster cooling and drying of the color material of the thermoplastic resin ribbon material on the print media generates a bonding effect between the print media and the ribbon.

When color printing is performed on a given area of the print media, the latter is kept stationary, i.e., is not advanced, whereas the thermal transfer ribbon is advanced to the next color stripe for printing the next color onto the same given area. So a plurality of ribbon positions is required for color printing on one given print media position. Separation of the color ribbon and the print media involves a shear movement in the system in accordance with the above cited U.S. Pat. No. 4,250,511. To separate the ribbon from the print media requires a ribbon carrier of sufficient strength to withstand the stress in the transport direction to break the bond between the ribbon and media. Thus, when thermoplastic resin based ribbon material being used the carrier would have to be made relatively thick or strong to overcome the bonding forces.

DISCLOSURE OF THE INVENTION

The main object of the present invention is to provide a thermal print apparatus designed such that the thermal transfer ribbon can be separated from the print media essentially normal to the print media surface such that shear motion between the media and the ribbon is greatly reduced. This allows the use of a relatively thin carrier material for the ribbon and allows the thermal transfer ribbon to be advanced independently and separated from the print media while keeping the latter stationary.

These and other objects are accomplished in accordance with the invention basically by use of a ribbon supporting means which is movable to and fro relative to the print media and guides the ribbon away from the print media at an angle greater than 45 degrees so that the ribbon, upon retraction of the ribbon support from the print media, is separated essentially in a normal direction from the paper.

In embodiment of the invention the ribbon support means is formed by the print head. The ribbon guiding means guides the ribbon immediately behind the print area in the transport direction of the media and ribbon. An eccentric moves, in a controlled manner, the ribbon support away from and toward to the print media. In other embodiments of the invention the backing means urges the print media against the ribbon and ribbon support which is resiliently fixed to a support.

Another main object of this invention is to provide a new and improved method of thermal transfer printing, especially color printing using a multi-colored transfer ribbon wherein colors are arranged in sets of transverse stripes. This is accomplished in accordance with the invention in an advantageous manner by selectively clamping ribbon and print media between backing means and the heat applying print head by moving the ribbon in contact with the print media, performing a print operation by selectively energizing heat elements of the print head, retracting the ribbon from the print media essentially normal to its surface, advancing the ribbon to the next appropriate color stripe independent of the print media advancement, repeating these steps, if necessary, until a complete line is printed, and advancing the print media to the next print line. This method assures an easy separation of ribbon and media, allows independent advancement of ribbon and media, greatly reduces shear motion between both, and therefore, overall improves the thermal printing system.

BRIEF DESCRIPTION OF DRAWING

In the following, the invention will be described in detail in connection with the accompanying drawing showing an embodiment of the invention, in which.

BEST MODE FOR CARRYING OUT THE INVENTION

Figure 1:
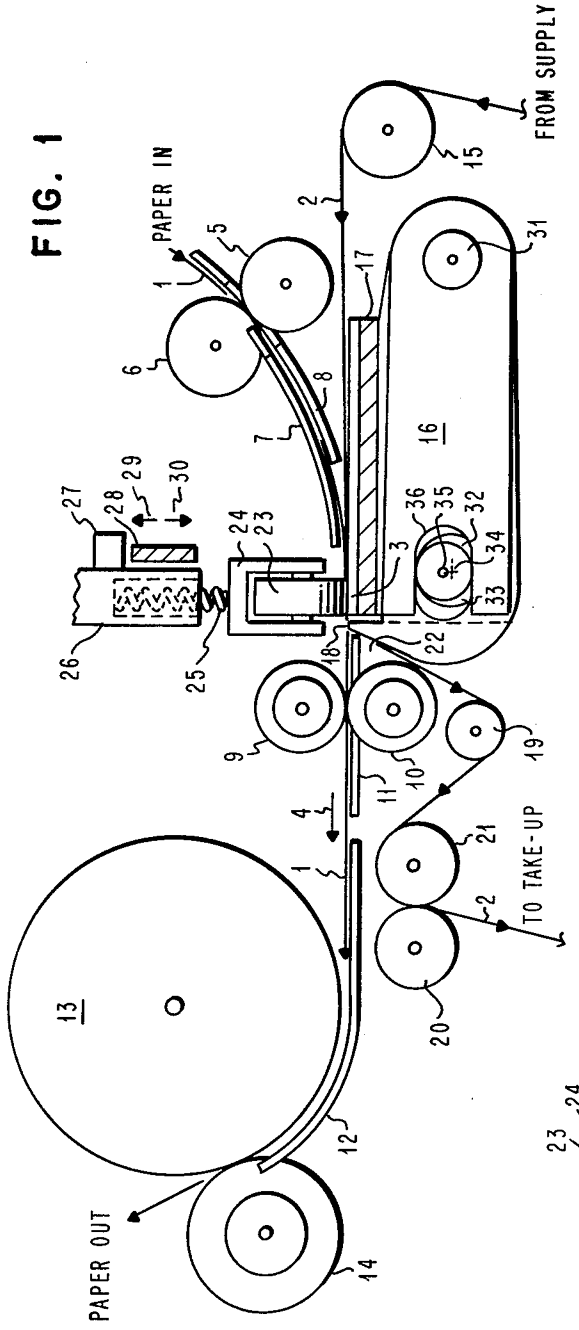
FIG. 1 is a side-view showing schematically the paths of the print media and the thermal transfer ribbon in print position, whereby the print media and ribbon are clamped between ribbon support and backing means.

FIG. 1 schematically depicts the paths for the print media 1, e.g., ordinary paper 1, to be imprinted, the paths for the thermal transfer ribbon 2 in front in the print area 3 and behind the latter and the print area 3 where those paths combine.

The paper path is formed on the paper entrance side of a pair of rollers 5 and 6 forming a nip gripping the inserted paper 1. Further, adjacent to rollers 5 and 6 the path includes an upper paper guide member 7 and a lower paper guide member 8 which are slightly bent such that the paper 1 guided in between these members approaches the print area 3 tangentially. Behind print area 3 two rollers 9 and 10 grip and advance the paper 1, guided from members 11 and 12 to a pair of exit rollers 13 and 14 which transport the paper 1 out of the print apparatus.

The path for the ribbon 2, fed from a supply, not shown, includes a guide roller 15, a ribbon support means 16 with a heat applying print head 17 mounted on top and being considered as an integral part of same, the means for guiding the ribbon 2 away from the paper 1 said means being formed by a support beam 18 and a ribbon guiding roller 19, and a pair of metering rollers 20 and 21 advancing the ribbon toward a take-up, not shown. The angle 22 formed between the paper path, formed here by straight, horizontally arranged paper guide member 11, and the ribbon path, formed here by the support beam 18 and the guiding roller 19 together guide the ribbon 2 away from the paper path, is chosen to be greater than 45 degrees. Especially because of physical constraints the value of angle 22 is preferably chosen to be between 45 and 90 degrees.

The print area 3 in which paper paths and ribbon paths join for printing purposes will be described now in more detail. The heat applying print head 17 is mounted on the ribbon support 16. The actual heat elements are concentrated in a row near the support beam 18 underneath the backing means. The backing means consists of a bar 23 secured to a frame 24 which is resiliently fastened by a spring 25 to a support 26. The bar 23 is as wide as the length of the heating elements of heat applying print head 17. Thus, under influence of spring means 25 bar 23 presses paper 1 against the color material carrying surface of ribbon 2 and the latter against the print head 17, i.e., the ribbon support 16. Upon energizing certain print head elements and applying heat to given areas of ribbon 2 the melted or softened color material is transferred to the paper 1.

Backing support means 26 includes a side arm 27 underneath which a lever 28 is arranged. By means, not shown, this lever 28 is lifted in direction of arrow 29 for removing backing bar 23 from the paper path and thus releasing pressure from paper 1 against the ribbon 2 and print head 17. This lifting function is especially helpful upon insertion of paper 1 in the paper path. It also might be applied upon incremental advancement of the paper during a printing operation. In lowering lever 28 in the direction of arrow 30, the necessary pressure between backing bar 23, paper 1, ribbon 2 and head 17 is applied. The backing bar 23 spans the entire length of the row of heating elements of heat applying print head 17 or in other words it spans the whole width of the area to be imprinted on paper 1.

The ribbon support 16 is carried by a rod 31 around which it is pivotable, and by a cam 32 being part of an eccentric 33. The rod 31 extends parallel to the print line, i.e., transverse to paper and ribbon transport direction 4. The eccentric 33 rotates around axis 34 and cam 32 rotates around its center 35. Cam 32 rides in an elongated slot 36 of ribbon support 16. Upon turning eccentric 33 around its axis 34 from the position below center 35 of cam 32, as shown in FIG. 1, 180 degrees into a position in which cam center 35 is below eccentric axis 34, as shown in FIG. 2, the ribbon support 16 is lowered in the direction of arrow 37 by pivoting it for a small angle around rod 31.

Figure 2:
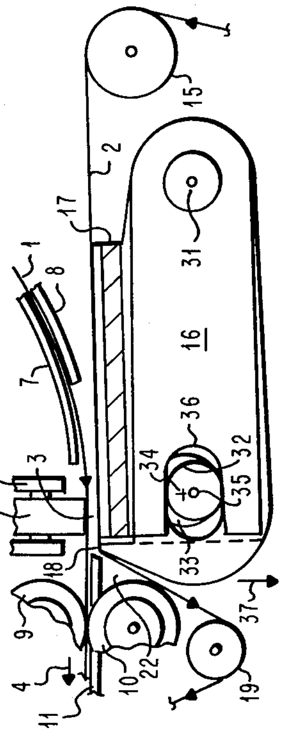
FIG. 2 shows the ribbon paths during ribbon advance independent of media advancement, whereby the ribbon support is lowered to separate the ribbon from the print media.

FIG. 2 depicts lowered position of ribbon support 16. By lowering ribbon support 16 the length of the ribbon path is shortened. The ribbon path is confined by guide roller 15, ribbon support 16, represented especially by heat applying print head 17 on which ribbon 2 rests, by support beam 18 and ribbon guiding roller 19. Due to the shortened ribbon path the ribbon is kept tight by means of the pair of metering rollers 20 and 21. Thus, the ribbon 2 is separated essentially in a normal direction from the surface of paper 1. Therefore, practically no shear between paper 1 and ribbon 2 occurs.

In addition to moving the ribbon support 16 relative to paper 1, the ribbon 2 is guided away from the paper path at an angle 22 as shown. Thus, the separation of the ribbon 2 from the paper 1 is performed with practically no shear and immediately adjacent print area 3.

In operation, to perform color printing a multi-colored ribbon can be used having color stripes transverse of the length of the ribbon arranged in repeating sets. For printing, paper 1 is inserted in the nip of rollers 5 and 6 and advanced until rollers 9 and 10 grip the leading edge. Backing bar 23 is lifted by actuated lever 28. Different controls and drives of the printing apparatus are not shown as they are self-evident and self-explanatory for persons skilled in the art. For printing the first print line, ribbon support 16 with head 17 on it is in an upper position as shown in FIG. 1 and by lowering lever 28 in the direction of arrow 30, the paper 1 and the ribbon 2 are clamped between backing bar 23 and print head 17. Then by energizing the appropriate heat elements of heat applying head 17 in print area 3 the specific melted or softened color material of ribbon 2 will be transferred to paper 1. By controlled rotation of eccentric 33, the ribbon support 16 is lowered into the position shown in FIG. 2, thereby retracting ribbon 2 from paper 1. Next ribbon 2 is advanced to the next appropriate color stripe. The paper 1 has not been and will not be advanced if another color is to be printed on the very same area. By rotating eccentric 33 again in its upper position shown in FIG. 1, ribbon 2 and paper 1 are again clamped. Again appropriate heat elements of heat applying print head 17 are energized for melting or softening color material at the desired spots for transferring them to paper 1. The ribbon 2 is again retracted, advanced, clamped and heated for a third color on the very same print line of paper 1. After having completed all color printing in the present printing line, the paper is advanced to the next position to be imprinted. This can be performed using all or only a part of the available colors in the aforementioned method.

By cooperation of ribbon support 16 being movable relative to paper 1 and guiding the ribbon 2 away from the paper 1 in an angle greater than 45 degrees, a substantial movement of the ribbon normal to the paper is assured in the print area 3. This is essential for performing color printing of high quality using resin based color material formulations. By practically avoiding shear motion during relative movement between paper 1 and ribbon 2, and thereby reducing stress in ribbon 2 a less expensive, simpler, and thinner carrier can be used.

It should be noted that printing in one color, e.g., black, can also be performed advantageously with the print apparatus in accordance with the invention. Paper 1 and ribbon 2 then can be continuously advanced and ribbon support 16 is not retracted from its position shown in FIG. 1. The separation of ribbon 2 from paper 1 is performed effectively by the ribbon guiding means 18 and 19 establishing the significant guide-away angle 22. By this, both parts are separated essentially normal to each other with very little shear motion between. This eliminates the need of a relatively bulky, strong ribbon carrier.

While this invention has been particularly shown and described with reference to a preferred embodiment thereof, it will be understood by those skilled in the art that foregoing and other changes in form and details may be made therein without departing from the spirit and scope of the invention.

We claim:

1. A thermal print apparatus for printing on print media with a thermal transfer ribbon such as a multi-colored one wherein colors are arranged in sets of transverse stripes, by means of a heat applying print head arranged transverse to the media transport direction and a backing means urging the media against the ribbon and the latter against the print head; said apparatus comprising:

(a) a ribbon supporting means mounted for selective movement relative to said media for bringing said thermal ribbon into contact with said media and for releasing it from contact with said media;

(b) means for moving said ribbon supporting means relative to said media, and (c) means for guiding said thermal ribbon away from said media at an angle greater than 45 degrees thereto, so that upon retraction of said ribbon supporting means away from said media said ribbon is separable from said media in a substantially normal direction whereby shear motion between said thermal ribbon and said media is significantly reduced.

2. The thermal print apparatus of claim 1, wherein said means for guiding said thermal ribbon away from said media are arranged immediately adjacent to the print area whereby separation of said ribbon from said media is performed immediately adjacent said print area.

3. The thermal print apparatus of claims 1 or 2, wherein said means for guiding said thermal ribbon away from said media comprise a support beam and a guiding roller positioned immediately behind said print area thereby guiding said ribbon off the media surface in an angle of substantially 45 degrees.

4. The thermal print apparatus of claim 2, wherein said angle is between 45 and 90 degrees.

5. The thermal print apparatus of claim 1, wherein said ribbon supporting means includes the heat applying print head such that said head is selectively movable relative to said media.

6. The thermal print apparatus of claim 1, wherein said backing means urging said media against said ribbon is resiliently fixed to a support (26);

said support being mounted for movement relative to said media; and said backing means being positioned opposite said heat applying print head such that they are able to cooperate whereby said print area is defined.

7. The thermal print apparatus of claim 1, wherein said means for moving said ribbon supporting means relative to said media comprises an eccentric cam device.

8. A method of printing on print media using a thermal transfer ribbon, such as a multi-colored one wherein colors are arranged in sets of transverse stripes, which is guided together with said print media between a backing means and a heat applying print head, comprising the steps of:

(1) selectively clamping said ribbon and said media between said backing means and said print head by moving said ribbon in contact with said media;

(2) performing a print operation by selectively operating said heat applying print head;

(3) retracting said ribbon from said media essentially normal to its surface;

(4) advancing said ribbon to the next appropriate color area, independent of print media advancement;

(5) repeating the above steps, if necessary until a complete line is printed; and (6) advancing said media to the next printing line if the present printing line is finished.

9. The method of printing on print media of claim 8, further including the step of performing said retracting of said ribbon from said media adjacent to said print line for separating said ribbon from said media in the print area.

10. The method of printing on print media of claim 8 or 9, further including the step of guiding said ribbon off said media at an angle substantially equal to 45 degrees.

11. The method of printing on print media of claim 10, further including the step of guiding said ribbon off said media at an angle being between 45 and 90 degrees.

* * * * *